Nov. 5, 1935.                A. RÖSCH                 2,020,080
              LOAD REGULATION OF ELECTRIC POWER PLANTS
                         Filed Jan. 8, 1934
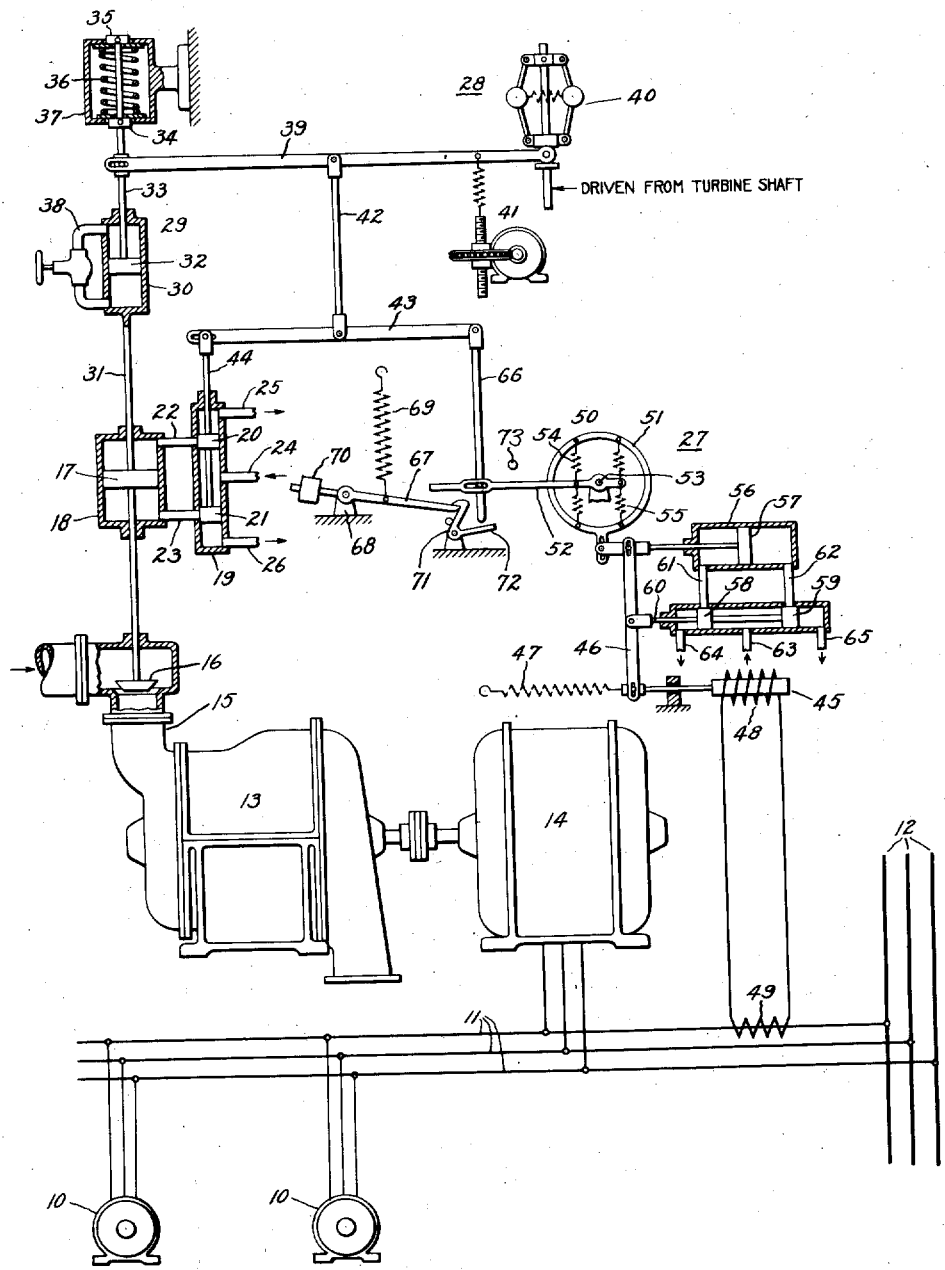
Inventor:
Arthur Rosch,
by Harry E. Dunham
His Attorney.

Patented Nov. 5, 1935

2,020,080

UNITED STATES PATENT OFFICE 2,020,080

LOAD REGULATION OF ELECTRIC POWER PLANTS

Arthur Rosch, Brieseland-Sud, Kreis, Osthavelland, Germany, assignor to General Electric Company, a corporation of New York Application January 8, 1934, Serial No. 705,774
In Germany January 12, 1933

9 Claims. (Cl. 290—4)

The present invention relates to load regulation of electric power plants, more specifically to arrangements in which electric current is supplied to a power or distributing line from a main source of supply, such as an external power line, and an auxiliary or internal source of supply, such as a turbo-generator. In arrangements of this kind it is desirable to maintain the supply of electric current from the main source or external power line constant whenever a higher rate must be paid on loads exceeding a predetermined amount drawn from the external line. To make this clearer, attention is directed to the following example:

Let us assume that a factory needs 10,000 kw. for operating its motors, this factory being provided with an auxiliary or internal source of 2000 kw. in the form of a turbo-generator and receiving its main supply of 8000 kw. from a main or external source. The rate per kw. from the external source is 1¢ for loads up to 8000 kw. and 3¢ for loads exceeding 8000 kw. The cost of produced kw. from the internal or auxiliary source is 2¢. It is obvious that in such a case it is desirable to draw 8000 kw. power from the external source and supply the load demand beyond 8000 kw. from the auxiliary source. Thus, if the load demand at a certain instant be 9000 kw., 8000 kw. will be drawn from the external source and 1000 from the internal source. If the load demand be 7000, it would be supplied from the external source entirely, whereas the internal source would be put out of operation.

Arrangements of this kind are usually provided with a governing mechanism which includes a speed regulator for the internal source of supply, which regulator becomes operative when the speed exceeds a certain predetermined value, and a load regulator for controlling the prime mover of the internal source of supply in response to changes in load supply from the external or main source of supply. With respect to the above example, the load regulator causes increased supply from the internal source in response to an increasing supply from the external source, resulting in a constant supply of load drawn from the external source. When the supply from the external source decreases, the load regulator causes a decrease in load supply from the internal source, for instance, by closing the inlet valve of a turbine operating as a prime mover for an electric generator. Difficulties have been experienced with arrangements of this kind whenever the supply of load from the external source decreases or fails due to a failure of the main source because with the ordinary arrangement the load governor tends to decrease the internal load supply in response to decreasing and also a failing load supply from the external source. Whenever such failure of the external source occurs it is desirable to increase the load supply from the internal source, preferably by fully opening the valve or valves of the prime mover of the internal source.

One object of the present invention is to provide an improved construction and arrangement of regulating mechanisms for electric power plants of the type above specified whereby the load supply from the auxiliary or internal source is automatically increased in response to failure of the load supply from the external or main source of supply.

For a consideration of what I consider to be novel and my invention, attention is directed to the following description and the claims appended thereto in connection with the accompanying drawing which forms a part of my specification.

In the single figure of the drawing I have shown a plant embodying my invention.

The plant comprises a plurality of motors 10 connected to a power line 11. This line 11 is connected to a main source of supply, such as an external power line 12, and to an auxiliary source of supply, in the present instance shown as a turbo-generator comprising a prime mover or elastic fluid turbine 13 coupled with an electric generator 14. The turbine has an inlet 15 with a valve 16 for controlling the flow of actuating fluid thereto.

As pointed out above, a regulating arrangement for the valve is provided to regulate the turbo-generator or the internal source of supply so as to maintain the supply of current from the main source constant. To this end the valve is connected to the piston 17 of a hydraulic motor comprising a cylinder 18 in which the piston 17 is slidably arranged and a pilot valve 19 having valve heads 20 and 21 which normally register with the ends of connecting tubes 22 and 23 between the pilot valve and the cylinder. An intermediate point of the pilot valve cylinder is connected to a conduit 24 for receiving actuating fluid, such as oil, under pressure. Upper and lower portions of the pilot valve are connected to drain tubes 25 and 26 respectively. During operation, upward movement of the pilot valve heads 20 and 21 permits actuating fluid being supplied to the upper portion of cylinder 18 and drained from the lower portion thereof whereby the cylinder piston 17 is moved downward and causes closing of the valve 16. Downward movement of the pilot valve heads causes opening of the valve 16 and accordingly an increased supply of elastic fluid to the turbine, resulting in increased load supply from generator 14 to the line 11. The pilot valve is controlled by a load governing mechanism 27 in response to changes in load supply from the main source 12 and by a speed governing mechanism 28 in response to speed changes of the turbo-generator. The speed governor in the present arrangement is set for a predetermined high speed whereby it is inoperative as long as the speed of the turbine set does not exceed a certain value, that is, as long as power is supplied from the external source. The speed of the turbo-generator set is normally fixed by the external source, assuming the latter is a source of alternating current.

To permit control of the hydraulic motor and resetting of its pilot valve by the load governor and also by the speed governor and at the same time to prevent the load governor control from affecting the speed governor setting I have provided an isochronous speed governing mechanism. This isochronous speed governing mechanism includes in known manner a dashpot 29 having a cylinder 30 rigidly connected to the stem 31 of the piston 17 and a piston 32 slidably arranged in the dashpot and connected to a stem 33. The latter has collars 34 and 35 between which a spring 36 is provided. The spring is held in a fixed casing 37. The dashpot cylinder is filled with oil or like fluid and upper and lower portions of the dashpot are connected by a regulatable bypass 38. If the bypass 38 were fully closed, the dashpot would act like a rigid link between stems 31 and 33 and the operation of the arrangement would be the same as that of an ordinary speed governing mechanism. The bypass, however, is ordinarily opened, thereby permitting displacement of fluid between the upper and the lower part of the dashpot cylinder.

During operation, rapid upward movement of the piston 17 of the hydraulic motor causes upward movement of the dashpot cylinder 30 together with the piston 32 whereby the latter puts the spring under compression. The compressed spring in turn effects slow downward movement of stem 33 together with piston 32 of the dashpot whereby displacement of fluid from the lower part of the dashpot through the bypass 38 into the upper part of the dashpot takes place. If the piston 17 moves downward, a similar operation takes place, resulting in displacement of fluid from the upper part of the dashpot cylinder into the lower part thereof.

The stem 33 of the dashpot piston 32 is pivoted to the left-hand end of a floating lever 39 having its right-hand end connected to a speed governor 40. An intermediate point of lever 39 is connected to a known synchronizing arrangement 41, permitting remote setting of the speed governor 40. Another intermediate point of lever 39 is pivoted to a link 42 which in turn is connected to a lever 43 having its left-hand end pivoted to a stem 44 of the pilot valve heads 20 and 21.

Let us assume the turbo-generator is under speed governor control. An increase in speed, due to a decreased demand for load, then causes the flyballs of the governor to move outward whereby the right-hand end of lever 39 is turned upward, causing upward movement of link 42, the left-hand end of lever 43 and the pilot valve heads 20, 21. Upward movement of the latter, as stated above, effects closing of the turbine valve 16, resulting in a decreased supply of elastic fluid to the latter and accordingly a reduction in speed. Downward movement of the valve 16, which takes place due to downward movement of piston 17 in the hydraulic cylinder 18, causes downward movement of dashpot cylinder 30 and, as pointed out above, upward movement of dashpot piston 32. Upward movement of the latter in turn effects upward movement of the left-hand end of floating lever 39 and of the link 42 and the left-hand end of lever 43, resulting in upward movement of pilot valve heads 20 and 21. The latter thereby assume their original position in which they cover the ports to connecting conduits 22 and 23. It will be readily understood that the relative movement between the dashpot cylinder 30 and its piston 32 causes in substance a shortening and lengthening of the connection between the stems 31 and 33. This shortening and lengthening, as just pointed out, effects resetting of the pilot valve of the hydraulic motor and, as will be more fully understood later, permits independent control of the hydraulic motor by the speed governor and the load governor.

Let us now consider the load governor 27. It comprises means responsive to changes in load supply from the external source 12 to the line 11. In the present instance I have shown a relay in the form of an electromagnet having a core 45 pivotally connected to a link 46 and biased to the left by a spring 47. A coil 48 surrounds the core 45 and is connected to the secondary of a current transformer 49. An increase in supply of current from the external source 12 to the line 11 causes an increase of current in the secondary of the transformer and also in the coil 48 of the relay, thereby pulling the core 45 to the right against the biasing force of the spring 47. The movement of the core 45 is transmitted to a device 50 comprising a rotatable drum 51, a lever 52 fulcrumed at 53 and two pairs of springs 54 and 55 respectively. The springs of each pair are connected at one end to the drum and at the other end to the lever at opposite sides of the fulcrum 53. The transmission of movement of the core 45 to the device 50 is accomplished by means of a hydraulic motor comprising a cylinder 56 having a piston 57 pivotally connected to the upper end of lever 46 and to the drum 51, and a pilot valve including valve heads 58 and 59 fastened to a stem 60 which latter is pivotally connected to an intermediate point of the lever 46. The pilot valve has ports connected by conduits 61 and 62 to the cylinder 56, another port 63 for receiving actuating fluid and drain ports 64 and 65. This hydraulic motor together with the pilot valve are similar to the hydraulic motor for the valve 16 described above. The hydraulic cylinder represents in substance a motor, whereas the pilot valve is a control member for the motor. During operation an increased supply of current from the main source 12 causes movement of the magnet core 45 to the right, whereby the lever 46 moves the pilot valve heads 58 and 59 to the right, effecting supply of actuating fluid through port 63, the conduit 62, to the right-hand part of the cylinder 56 and draining of actuating fluid from the left-hand part of cylinder 56 through conduit 61 and drain port 64. The piston 57 in cylinder 56 thereby is moved to the right and causes clockwise turning movement of the drum 51 with the springs 54 and 55. The lever 52 thereby turns upward, that is, in clockwise direction. An intermediate point of this lever is pivoted to a link 66 which is connected to the right-hand end of the lever 43. Thus, increasing supply of current from the main source 12 causes clockwise movement of lever 52 whereby the link 66 moves upward and through lever 43 effects downward movement of the pilot valve stem 44. The valve heads 20, 21 thereby uncover their ports and permit the supply of actuating fluid from the conduit 24 through conduit 23 to the lower part of cylinder 18 and draining of actuating fluid from the upper part of the cylinder 18 through the conduit 22, the pilot valve and the drain conduit 25. The piston 17 of the hydraulic motor thereby moves upward, opening the valve 16 to the effect that an increased supply of fluid to the turbine takes place, thereby increasing the power generation of the turbo-generator set to balance the increased demand for load to ultimately keep constant the load supply from the external source 12.

The resetting of the pilot valve heads 20 and 21 during such operation takes place in the manner above described, that is, through shortening and lengthening of the link defined by the dashpot. The resetting of pilot valve heads 58 and 59 takes place directly by the movement of the piston 57, that is, movement of the pilot valve heads 58 and 59 towards the right effects movement of the piston 57 towards the left. The arrangement is such that the latter movement causes the pilot valve heads to assume their original position. This is the usual kind of follow-up mechanism well known in the art.

When the load demand of the motors 10 decreases, the supply of load from the external source decreases. This decrease of load from the external source effects through transformer 49, the relay 45, 48, movement of the pilot valve heads 58, 59 to the right, whereby actuating fluid is supplied to the left-hand portion of cylinder 56 and drained from the right-hand portion thereof, thus causing piston 57 to move to the right, effecting counter-clockwise turning movement of device 50 with the lever 52. This causes downward movement of the link 66 and finally closing movement of the valve 16, resulting in a decreasing load output from the turbo-generator set and an increased, more specifically constant supply of load from the external source.

As stated above, the decrease in supply of load from the external source may be due to failure of the external source in which case the ordinary mechanism causes closing of the turbine valve.

An important feature of my invention is the provision of means to prevent closing of the turbine valve whenever failure of the current supply from the external source occurs. This means comprises a lever 67 fulcrumed at 68 and biased in counter-clockwise direction by a spring 69 and a weight 70. The right-hand arm of the lever engages a fulcrumed latch 71 having an arm 72 adjacent the lower end of the link 66.

The operation of the arrangement is as follows: A decrease in power supply from the external source causes, as pointed out above, counter-clockwise movement of the lever 52. If this decrease in supply is due to failure of the external source, the left-hand end of lever 52 is moved downward far enough to unlatch the lever 67, that is, to move the latch away from the right-hand end of this lever. As soon as the latch 72 is removed, lever 67 is forced upward by the two forces of the spring and the weight 70 and thereby engages the left-hand end of lever 52 and carries this lever together with the link 66 upward. The upward movement of the lever 52 and the link 66 is limited by a stop 73. As the lever 52 is moved towards the stop 73 the left-hand end of lever 43 is moved down far enough to effect through the pilot valve (20, 21) and the hydraulic motor (17, 18) full opening of the valve 16. Thus, to summarize, a failure in the load supply from the external source at first causes normal operation of the load regulating mechanism, that is, an operation tending to cause closing of the turbine valve, and then causes a reversing of this operation by unlatching the lever 67, whereby the turbine valve is fully opened. As soon as the turbine valve is fully opened the turbine speeds up until it reaches a speed at which the speed governor 40 assumes control of the turbo-generator set. The lever 67 and the latch 71 may be reset by hand.

With my invention I have accomplished an improved regulating arrangement for power plants whereby the supply of load from an external source is maintained constant and an auxiliary source is regulated to satisfy the demand for load in excess of the constant supply. The arrangement includes a load governing and a speed governing mechanism, more specifically an isochronous speed governing mechanism which allows independent operation by the load governor and the speed governor of a single valve or like means for controlling the supply of actuating fluid to a prime mover for driving an electric generator. The arrangement also includes means for fully opening the valve of the prime mover, that is, to reverse the normal operation of the load governing mechanism during failure of the load supply from the external source. From another viewpoint, the last means serves to render the load governor inoperative and to fully open the inlet valve of the prime mover in response to failure of the main source of current supply. The load governor is rendered inoperative or its operation is reversed in response to the closing movement of the prime mover valve called for by the load governor during failure of the main source.

What I claim as new and desire to secure by Letters Patent of the United States, is.—

1. The combination of an electric power line for supplying electric energy, a main source of supply and an auxiliary source of supply connected to the line, means for normally controlling the supply from the auxiliary source in proportion to changes in the supply from the main source to maintain the supply from the main source constant, and other means for automatically rendering the controlling means inoperative and for effecting increasing supply from the auxiliary source in response to failure of the main source.

2. The combination of an electric power line, a main source and an auxiliary source for normally supplying electric energy to the line, the auxiliary source comprising a generator and a prime mover for driving the generator, means for normally controlling the prime mover in proportion to changes in power supply from the main source to the power line to maintain the supply from the main source to the power line constant whereby the output of the generator decreases with decreasing supply from the main source, and means for automatically rendering said control means inoperative and for effecting increasing output of the generator in response to failing supply from the main source.

3. The combination of an electric power line, a main source and an auxiliary source of supply connected to the line, the auxiliary source comprising a generator and a prime mover for driving the generator, a valve for controlling the supply of actuating fluid to the prime mover, an isochronous speed governing mechanism and a load governing mechanism connected to the valve for normally controlling the valve in response to changes in load supply from the main source to the power line, and means for automatically reversing the operation of the load governing mechanism in response to failure of the main source.

4. The combination of an electric power line, a main source and an auxiliary source of supply connected to the line, the auxiliary source comprising a generator and a prime mover for driving the generator, a valve for controlling the supply of actuating fluid to the prime mover, an isochronous speed governing mechanism and a load governing mechanism connected to the valve for normally controlling the valve in response to changes in load supply from the main source to the power line, the speed governing mechanism including a speed governor driven from the prime mover and set to assume control of the prime mover at a predetermined high speed, and means for fully opening the valve and rendering the load governing mechanism inoperative in response to failure of the main source.

5. The combination of an electric power line, a main source and an auxiliary source comprising a turbo-generator set for supplying electric energy to the line, a valve for controlling the flow of fluid to the turbine of the turbo-generator set, a load regulator responsive to changes in the supply of energy from the main source to the power line for normally regulating the valve to maintain said supply from the main source substantially constant, the load regulator effecting increased opening of the valve as the supply from the main source increases and decreased opening of the valve as the supply from the main source decreases, means for rendering the load regulator inoperative, and means for automatically effecting opening of the valve, both said means operating in response to sudden failure of the main source.

6. The combination of an electric power line, a main source and an auxiliary source comprising a turbo-generator set for supplying electric energy to the line, a valve for controlling the flow of fluid to the turbine of the turbo-generator set, a load regulator responsive to the supply of energy from the main source to the power line for regulating the valve to maintain said supply from the main source substantially constant, and means for rendering the load regulator ineffective and for effecting full opening of the valve in response to failure of the main source, said means comprising a latch mechanism and a member on the load regulator for releasing the latch at a certain minimum load supply from the main source.

7. The combination of an electric power line for supplying electric energy, a main source of supply for normally supplying a substantially fixed load to the line, means including an auxiliary source of supply connected to the line for normally delivering an amount of energy to the line varying in response to variations of the load demand above said substantially fixed load, means for normally controlling the supply from the auxiliary source in proportion to changes in the supply from the main source, said controlling means causing an increased supply from the auxiliary source as the supply from the main source increases and vice versa whereby the main source is normally maintained substantially constant, and other means for rendering operation of the controlling means ineffective and for automatically increasing the supply from the auxiliary source, the two last named means being arranged to operate as the supply from the main source drops to a certain value.

8. The combination of an electric power line, consumers connected to the line, means including a main source for normally supplying a substantially fixed load to the line, means including an auxiliary generator and a prime mover driving the generator for normally delivering a load to the line varying in proportion to variations in load demand by the consumers above said substantially fixed load, a governing mechanism for controlling the prime mover in response to variations in load supply from the main source to maintain the supply from the main source substantially constant whereby load variations are first taken over by the main source and then transferred to the auxiliary generator, and means for rendering the governing mechanism inoperative in response to sudden considerable decrease in load supply from the main source and simultaneously to effect full load output of the auxiliary generator in response to complete failure of the main source.

9. The combination of a power line for supplying varying load to consumers, a main source of supply connected to the power line, an auxiliary source of supply connected to the power line, means for controlling the supply from the auxiliary source in proportion to variations of load demand from the power line, said controlling means effecting decrease in supply from the auxiliary source to the line in proportion to decrease in demand from the line, and means for rendering the last named means inoperative and to effect increase in supply from the auxiliary source to the line as the supply from the main source drops to a predetermined minimum value.

ARTHUR ROSCH.